DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 16

T896,002
FRICTIONAL COMPOSITIONS

Paul H. Richard, Wilmington, Del., assignor to E. I. du Pont de Nemours and Company, Wilmington, Del.

Filed Apr. 27, 1970, Ser. No. 32,449
Int. Cl. C09d *3/78;* F16d *13/60*
U.S. Cl. 117—161 UF
No Drawing. 9 Pages Specification

Standard frictional compositions such as brake and friction clutch materials, having a multiplicity of surface pores ranging from 1 to 100 microns in size when modified by impregnating the pores with a solid polymer of tetrafluoroethylene, having a molecular weight of at least 2000 and a melting point of at least 265° C., demonstrate improved resistance to high temperature fading and noise. The polymers are conveniently applied as dispersions in liquids such as tertiary hydrocarbons, aliphatic ethers and alcohols and the like with the polymer particle size ranging between about 0.1 and 50 microns. A standard frictional composition can be composed of, for example, rubber dust, asbestos and an adhesive binder.